(12) United States Patent
Smith

(10) Patent No.: US 9,552,067 B2
(45) Date of Patent: Jan. 24, 2017

(54) GESTURE INTERPRETATION IN NAVIGABLE ZOOM MODE

(71) Applicant: APPLE INC., Cupertino, CA (US)

(72) Inventor: Troy S. Smith, San Jose, CA (US)

(73) Assignee: APPLE INC., Cupertino, CA (US)

( * ) Notice: Subject to any disclaimer, the term of this patent is extended or adjusted under 35 U.S.C. 154(b) by 207 days.

(21) Appl. No.: 13/863,993

(22) Filed: Apr. 16, 2013

(65) Prior Publication Data

US 2013/0346913 A1 Dec. 26, 2013

Related U.S. Application Data

(60) Provisional application No. 61/663,346, filed on Jun. 22, 2012.

(51) Int. Cl.
*G06F 3/0488* (2013.01)
*G06F 3/01* (2006.01)
*G06F 3/0485* (2013.01)

(52) U.S. Cl.
CPC .............. *G06F 3/017* (2013.01); *G06F 3/0485* (2013.01); *G06F 3/04883* (2013.01); *G06F 3/04886* (2013.01); *G06F 2203/04806* (2013.01); *G06F 2203/04808* (2013.01)

(58) Field of Classification Search
CPC ...... G06F 3/017; G06F 3/048; G06F 3/04812; G06F 3/0488; G06F 3/04883; G06F 3/0485; G06F 2203/04806; G06F 2203/04808; G06F 17/211; G06F 17/25; G06F 17/26; G06F 17/212; G06F 17/243; G06F 17/30905; G09G 5/24; G09G 5/26; G09G 2340/0407; G09G 2340/045; G06T 11/60

USPC ....... 715/764, 784, 788, 800, 815, 863, 864; 314/173, 660

See application file for complete search history.

(56) References Cited

U.S. PATENT DOCUMENTS

| | | | |
|---|---|---|---|
| 7,840,912 B2 | 11/2010 | Elias et al. | |
| 9,007,405 B1 * | 4/2015 | Eldar et al. | 345/666 |
| 2003/0179239 A1 * | 9/2003 | Lira | G06F 3/0485 715/776 |

(Continued)

OTHER PUBLICATIONS

Braganza, et al., "Scrolling Behaviour with Single- and Multi-column Layout," International World Wide Web Conference, Apr. 2009, 10 pages.

*Primary Examiner* — Jeffrey A Gaffin
*Assistant Examiner* — Rinna Yi
(74) *Attorney, Agent, or Firm* — Morgan, Lewis & Bockius LLP

(57) ABSTRACT

An electronic device can be enhanced to enable its user to navigate about and view, on the device's display, different portions of a page or document while the device remains in a zoomed-in mode that magnifies the portion of the document that the device is currently displaying. Upon entering the zoomed-in mode, the device can magnify a portion of the document on the display. While in this mode, the device can react to user-produced gestures in a manner that is different to the manner in which the device would react to the same gestures otherwise. Responsive to user-produced gestures while in the zoomed-in mode, the device can navigate to other portions of the document while remaining in the zoomed-in mode, so that those other portions are also presented magnified. The device's user is not forced to first zoom-out from one document portion in order to zoom-in on another document portion.

27 Claims, 15 Drawing Sheets

(56) References Cited

U.S. PATENT DOCUMENTS

| | | | |
|---|---|---|---|
| 2005/0210380 A1* | 9/2005 | Kramer et al. | 715/518 |
| 2009/0109184 A1* | 4/2009 | Kim | G06F 3/04815 |
| | | | 345/173 |
| 2009/0150822 A1* | 6/2009 | Miller et al. | 715/784 |
| 2010/0238139 A1* | 9/2010 | Goertz et al. | 345/175 |
| 2012/0159402 A1* | 6/2012 | Nurmi et al. | 715/863 |
| 2012/0256967 A1* | 10/2012 | Baldwin | G06F 3/013 |
| | | | 345/684 |
| 2013/0111334 A1* | 5/2013 | Liang et al. | 715/252 |
| 2014/0006982 A1* | 1/2014 | Wabyick | G06F 17/212 |
| | | | 715/763 |

* cited by examiner

GESTURE INTERPRETATION IN NAVIGABLE ZOOM MODE

CLAIM OF PRIORITY

The present application claims priority under 35 U.S.C. §119(e) to U.S. Provisional Patent Application No. 61/663, 346, filed Jun. 22, 2012, and titled "GESTURE INTERPRETATION." The contents of U.S. Provisional Patent Application No. 61/663,346 are incorporated by reference herein.

FIELD

The disclosed technology relates generally to interpreting gestures in an electronic device. Disclosed embodiments relate more specifically to the reaction of the device to certain gestures while displaying one of a plurality of objects in a page.

BACKGROUND

A graphical user interface (GUI) allows a user to interact with an electronic device, e.g., personal computers (e.g., desktop, laptop), mobile digital devices such as smartphones and tablet computers and MP3 players, portable media players and gaming devices, household appliances, and office equipment.

A common approach to the architecture of a GUI is known as "windows, icons, menus, pointer" (WIMP). In WIMP approaches, a physical input device can control the position on a display of a pointer controlled by a pointing device. The display can present information organized in windows. Action can be initiated using gestures with the pointing device. In personal computers such elements can be modeled as a desktop.

Mobile digital devices, such as smartphones and tablet computers, due to constraints in space and available input devices are known to implement interaction techniques often referred to as post-WIMP user interfaces. Such interfaces can support interaction using one or more fingers in contact with a touch screen display. This approach can allow gestures such as pinching and rotating. Such gesture types are typically unsupported by simple WIMP pointer/point device combination.

SUMMARY

In certain embodiments of the invention, an electronic device can be enhanced to enable its user to navigate about and view, on the device's display, different portions of a page or document while the device remains in a zoomed-in mode that magnifies the portion of the document that the device is currently displaying. The device can enter the zoomed-in mode in response to detecting a particular user-produced gesture relative to the device's touch screen display while the device is presenting a document on that display. Upon entering the zoomed-in mode, the device can magnify a portion of the document—such as the portion relative to which the gesture was made—on the display. While in the zoomed-in mode, the device can react to user-produced gestures in a manner that is different to the manner in which the device would react to the same gestures while not in the zoomed-in mode. In response to detecting certain user-produced gestures while in the zoomed-in mode, the device can navigate to other portions of the document while remaining in the zoomed-in mode, so that those other portions are also magnified when they are displayed. As a result, while using a device having a relatively small display upon which zooming functionality is useful to view document portions that might appear too small when the document is shown in its entirety, the device's user is not forced to first zoom-out from one document portion in order to zoom-in on another document portion.

The technology includes methods, computer program products, and systems for gesture interpretation in an electronic device. The electronic device is adapted to display pages and to receive gestures. Each page includes objects, and is characterized by a page model relating objects. Upon displaying a first object, receiving a gesture in the electronic device. The received gesture is classified as a first gesture type or a second gesture type. For a gesture of the first gesture type, the electronic device continues to display the first object. For a gesture of the second gesture type, the electronic device determines a second object to display based on the received gesture and the page model. The electronic device then displays the determined second object.

In some embodiments, continuing to display the first object includes inhibiting the effect of the received gesture on at least one aspect of displaying the first object. In some embodiments inhibiting the effect of the received gesture on at least one aspect of displaying the first object includes inhibiting horizontal scrolling. In some embodiments displaying a first object includes displaying the first object zoomed to the width of the first object, with no vertical object-to-display offset. In some embodiments, displaying the determined second object includes displaying the determined second object zoomed to the width of the second object, with no vertical object-to-display offset. In some embodiments the received gesture is characterized by gesture attributes; and classifying the received gesture is based on a weighted vector of at least one gesture attribute. In some embodiments the received gesture is a single finger gesture characterized by attributes comprising gesture origin, gesture length, gesture time duration, and gesture direction.

BRIEF DESCRIPTION OF THE DRAWINGS

Reference will now be made, by way of example, to the accompanying drawings which show example implementations of the technology.

DETAILED DESCRIPTION

Reference now will be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still other implementation. Thus, it is intended that the present technology cover such modifications and variations that come within the scope of the technology.

Electronic devices, user interfaces for such devices, and associated processes for using such devices are described. In some embodiments, the electronic device is a portable communications device such as a mobile telephone that also contains other functions, such as personal digital assistant (PDA) or music player functions. Exemplary embodiments of portable multifunction electronic devices include, without limitation, the iPhone® mobile digital device and iPod Touch® mobile digital device from Apple, Inc. of Cupertino, Calif.

In the discussion that follows, an electronic device that includes a display and a touch-sensitive surface is described. It should be understood, however, that the electronic device can include one or more other physical user interface devices, such as a physical keyboard, a mouse, a joystick, a track pad. The electronic device may support a variety of applications, such as one or more of the following: drawing application, presentation, word processing, website creation, disk authoring, spreadsheet, gaming, telephone, video conferencing, an e-mail, instant messaging, voice memo, photo management, digital camera, digital video camera, web browsing, digital music player, and digital video player.

The applications that may be executed on the device may use at least one common physical user interface device, such as the touch-sensitive surface. One or more functions of the touch-sensitive surface as well as corresponding information displayed on the device may vary from one application to the next or within a respective application. In this way, a common physical architecture (such as the touch-sensitive surface) of the device may support the variety of applications with user interfaces that are intuitive and transparent.

Figure 1:
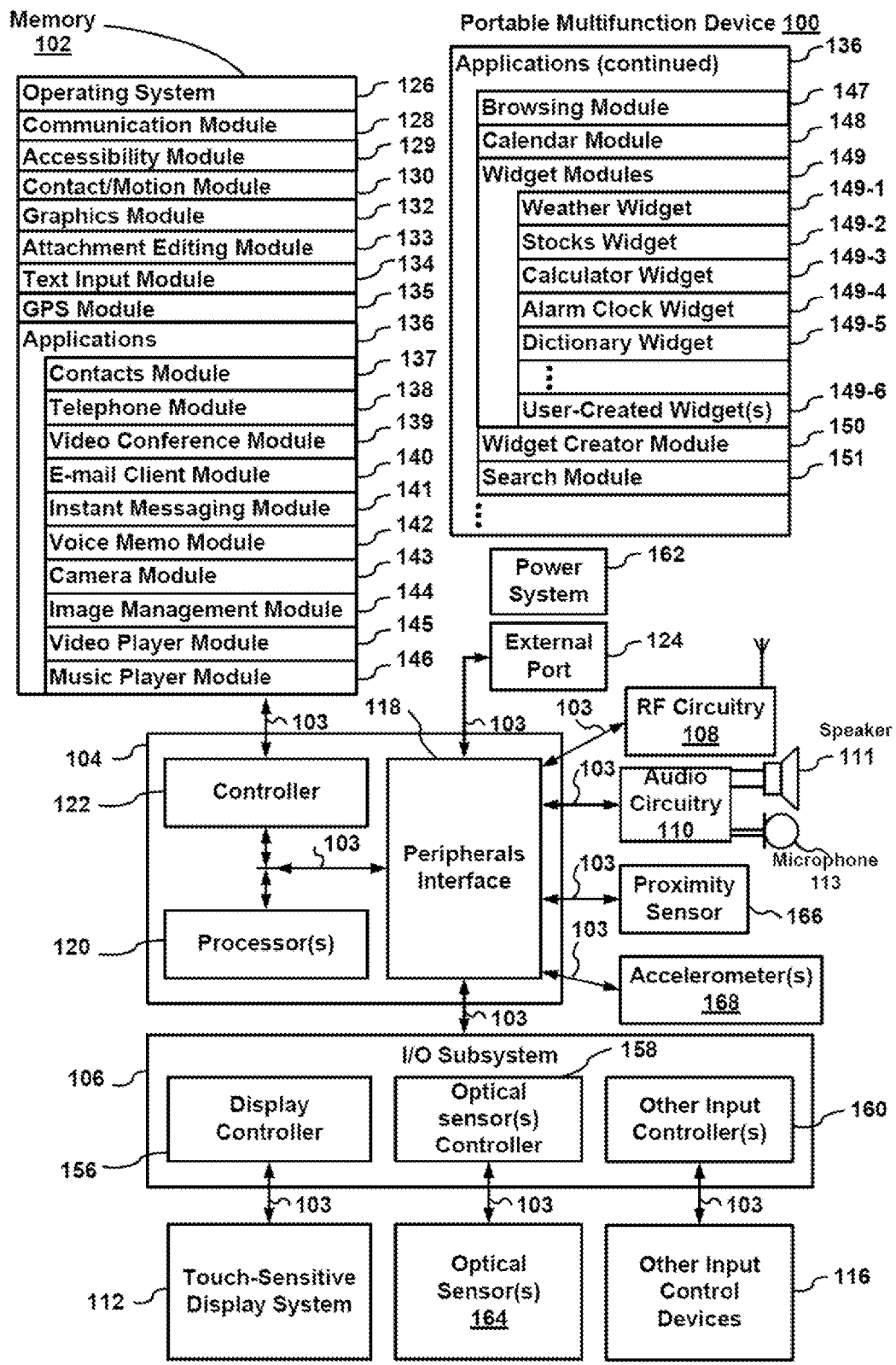
FIG. 1 is a block diagram illustrating portable multifunction devices with touch-sensitive displays in accordance with some embodiments.

Attention is now directed towards embodiments of portable electronic devices with touch-sensitive displays. FIG. 1 is a block diagram illustrating portable multifunction devices 100 with touch-sensitive displays 112. The touch-sensitive display 112 is sometimes called a "touch screen," and may also be called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components represented in FIG. 1 may be implemented in hardware, software, or a combination of both hardware and software, including one or more signal processing and application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122. Memory 102 can include various memory units such as a system memory, a read only memory (ROM), and a permanent storage device. The ROM can store static data and instructions that are needed by processing unit(s) and other modules of device 100. The permanent storage device can be a read and write memory device. This permanent storage device can be a non-volatile memory unit that stores instructions and data even when device 100 is powered down. Some embodiments of the invention can use a mass storage device (such as a magnetic or optical disk or flash memory) as a permanent storage device. Other embodiments can use a removable storage device (e.g., a floppy disk, a flash drive) as a permanent storage device. The system memory can be a read and write memory device or a volatile read and write memory, such as dynamic random access memory. The system memory can store some or all of the instructions and data that the processor needs at runtime.

Memory 102 can be implemented using any combination of computer readable storage media including semiconductor memory chips of various types (DRAM, SRAM, SDRAM, flash memory, programmable read only memory) and so on. Magnetic and/or optical disks can also be used. In some embodiments, memory 102 can include removable storage media that can be readable and/or writeable; examples of such media include compact disc (CD), read only digital versatile disc (e.g., DVD ROM, dual layer DVD ROM), read only and recordable Blu Ray® disks, ultra density optical disks, flash memory cards (e.g., SD cards, mini SD cards, micro SD cards, etc.), magnetic "floppy"

disks, and so on. The computer readable storage media do not include carrier waves and transitory electronic signals passing wirelessly or over wired connections.

In some embodiments, memory 102 can store one or more software programs to be executed by processing unit(s) 120. "Software" refers generally to sequences of instructions that, when executed by processing unit(s) 120 cause device 100 to perform various operations, thus defining one or more specific machine implementations that execute and perform the operations of the software programs. The instructions can be stored as firmware residing in read only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From memory 102, processing unit(s) 120 can retrieve program instructions to execute and data to process in order to execute various operations described herein.

The peripherals interface 118 couples the input and output peripherals of the device to the CPU 120 and memory 102. The one or more processors 120 run or execute various software programs/sets of instructions stored in memory 102 to perform various functions for the device 100 and to process data. In some embodiments, the peripherals interface 118, the CPU 120, and the memory controller 122 may be implemented on a single chip, such as a chip 104. In some other embodiments, they may be implemented on separate chips. Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet or a wireless network, such as a cellular telephone network, a wireless local area network (LAN) or a metropolitan area network (MAN), and other devices by wireless communication. The wireless communication may use any of a plurality of communications standards, protocols.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and transmitted to memory 102 and the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, a joystick, a click wheel, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and the microphone 113. The one or more buttons may include a push button (e.g., 206, FIG. 2). A quick press of the push button may disengage a lock of the touch screen 112 or begin a process that uses gestures on the touch screen to unlock the device. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user interface objects.

A touch screen 112 has a touch-sensitive surface, sensor or set of sensors that accepts input from the user based on haptic or tactile contact. The touch screen 112 and the display controller 156 (along with any associated modules and sets of instructions in memory 102) detect contact (and any movement or breaking of the contact) on the touch screen 112 and converts the detected contact into interaction with user interface objects (e.g., one or more soft keys, icons, web pages or images) that are displayed on the touch screen. In an exemplary embodiment, a point of contact between a touch screen 112 and the user corresponds to one or more finger(s) of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® mobile digital devices from Apple Computer, Inc. of Cupertino, Calif.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module); the optical sensor 164 may capture still images or video. In some embodiments, an optical sensor is located on the back of the device 100, opposite the touch screen display 112 on the front of the device, so that the touch screen display may be used as a viewfinder for still and video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIG. 1 shows an accelerometer 168 coupled to the peripherals interface 118. Alternately, the accelerometer 168 may be coupled to an input controller 160 in the I/O subsystem 106. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, an accessibility module 129, a contact/motion module (or set of instructions) 130, a graphics module (or set of instructions) 132, an attachment editing module 133, a text input module (or set of instructions) 134, a Global Positioning System (GPS) module (or set of instructions) 135, and applications (or set of instructions) 136. These modules, operating generally as known to those of skill in the art, will not be explained in detail herein, except as to illustrated embodiments of the present technology.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and an acceleration (a change in magnitude or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

The applications 136 may include the following modules (or sets of instructions), or a subset or superset thereof: a contacts module 137 (sometimes called an address book or contact list); a telephone module 138; a video conferencing module 139; an e-mail client module 140; an instant messaging (IM) module 141; a voice memo module 142; a camera module 143 for still and video images; an image management module 144; a video player module 145; a music player module 146; a browser module 147; a calendar module 148; widget modules 149, which may include weather widget 149-1, stocks widget 149-2, calculator widget 149-3, alarm clock widget 149-4, dictionary widget 149-5, and other widgets obtained by the user, as well as user-created widgets 149-6; widget creator module 150 for making user-created widgets 149-6; search module 151; and modules not illustrated such as video and music player module that merges video player module 145 and music player module 146; notes module; map module; online video module; other word processing applications, other image editing applications, drawing applications, presentation applications, JAVA-enabled applications, encryption, digital rights management, voice recognition, and voice replication.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., a video and music player module). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 or a touchpad. By using a touch screen or a touchpad as the primary input/control device for operation of the device 100, the number of physical input/control devices (such as push buttons, dials, and the like) on the device 100 may be reduced.

The predefined set of functions that may be performed exclusively through a touch screen or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
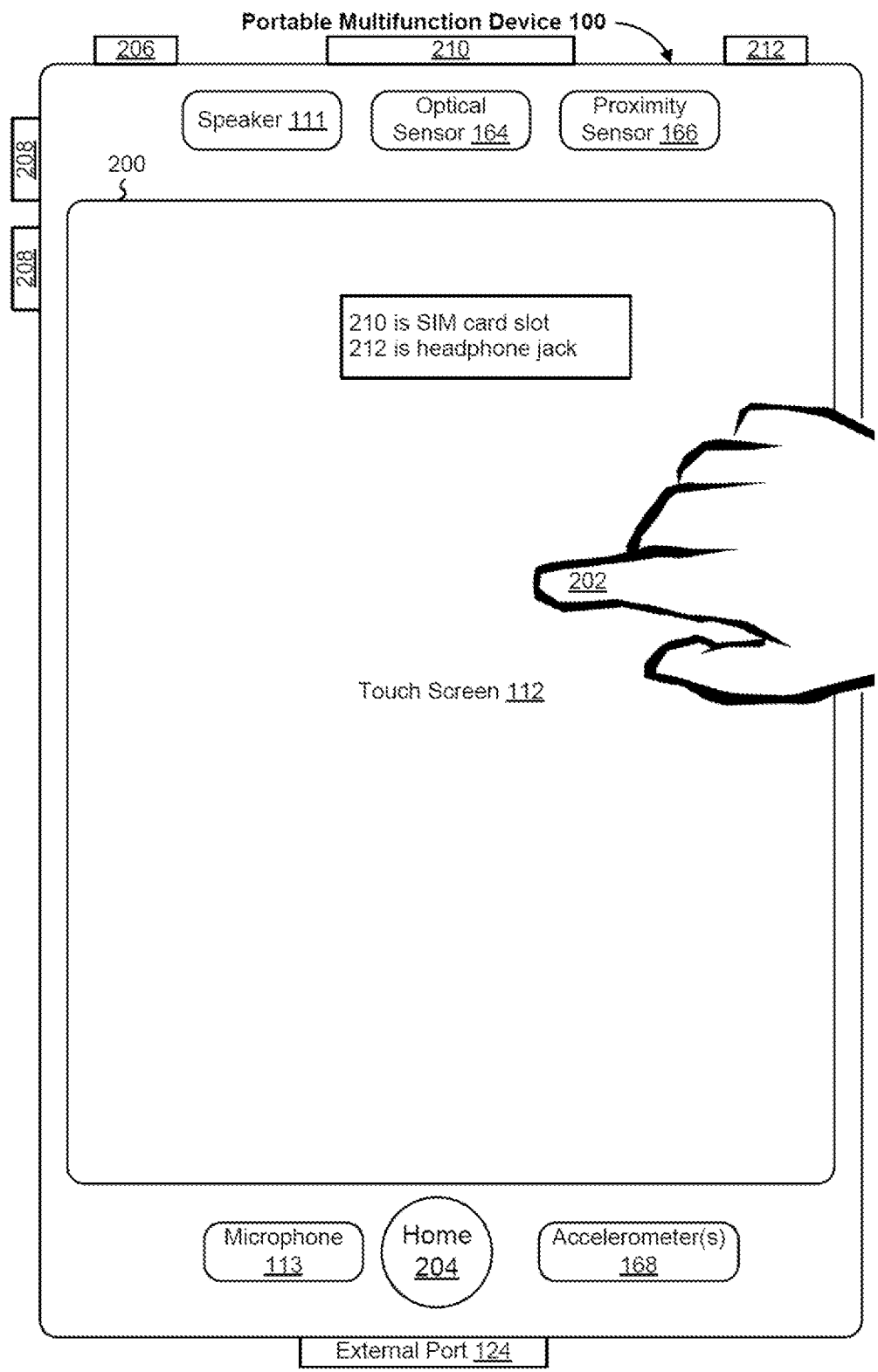
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within a GUI 200. In this embodiment, as well as others described below, a user may select one or more of the graphics by making contact or touching the graphics, for example, with one or more fingers 202 (not drawn to scale in the FIG.). In some embodiments, selection of one or more graphics occurs when the user breaks contact with the one or more graphics. In some embodiments, the contact may include a gesture, such as one or more taps, one or more swipes (from left to right, right to left, upward or downward) or a rolling of a finger (from right to left, left to right, upward or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In some embodiments, the device 100 includes a touch screen 112, a menu button 204, a push button 206 for powering the device on/off and locking the device, volume adjustment button(s) 208, a Subscriber Identity Module (SIM) card slot 210, and a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; or to unlock the device or initiate an unlock process. In an alternative embodiment, the device 100 also may accept verbal input for activation or deactivation of some functions through the microphone 113.

Figure 3:
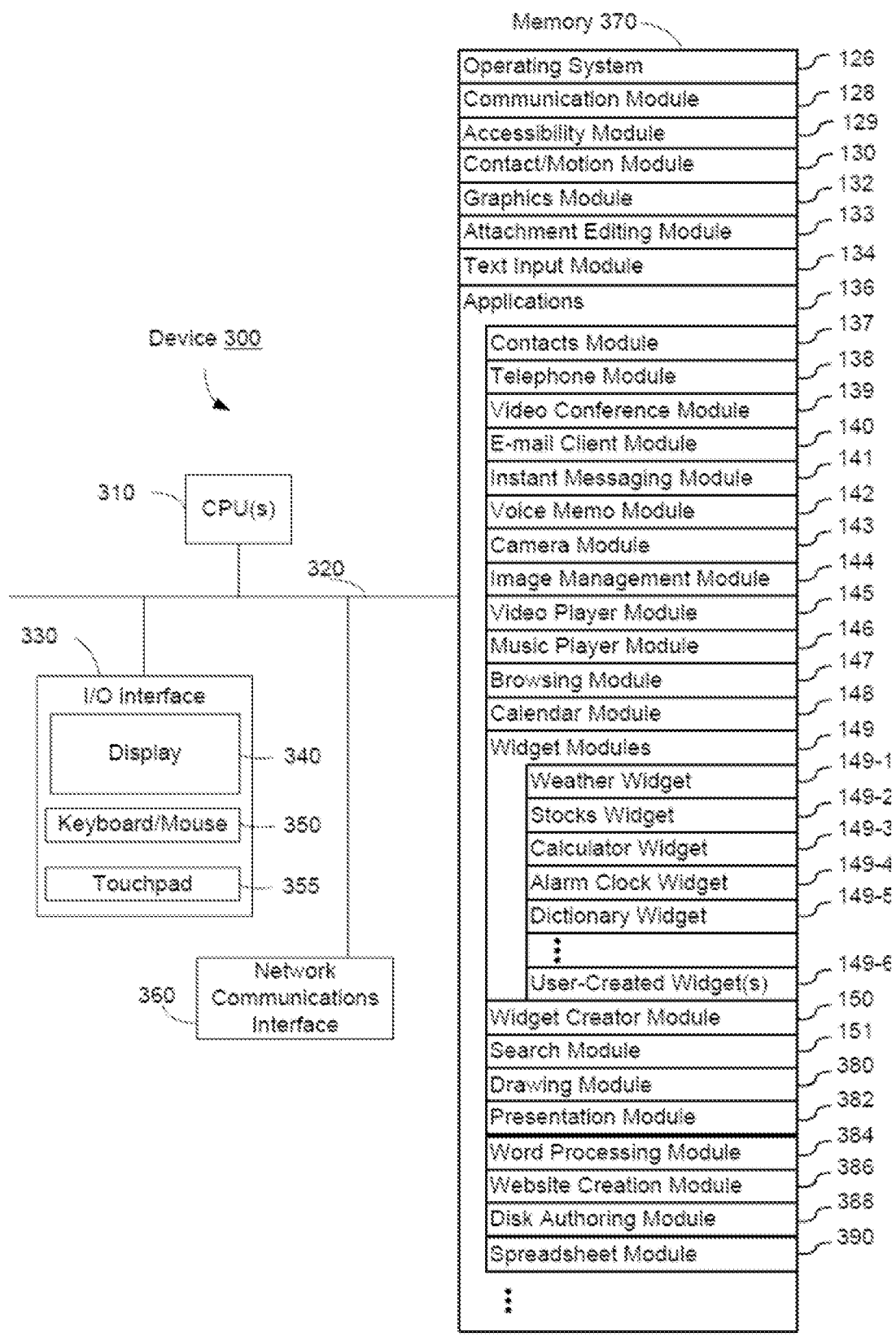
FIG. 3 is a block diagram of an exemplary computing device with a display and a touch-sensitive surface in accordance with some embodiments.

FIG. 3 is a block diagram of an exemplary computing device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which in some embodiments is a touch screen display 112. The I/O interface 330 also may include a keyboard or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, spreadsheet module 390 or attachment editing module 133, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Referring again to FIG. 2, a touch-screen display 112 of device 200 may be relatively small when compared to a typical computer display screen. While a typical computer display screen might have dimensions in the range of approximately 20 inches diagonally, touch-screen display 112 might measure just three or four inches diagonally. As a result, when viewing an entire document or page on display 112, a user might have a hard time making out details such as characters due to the tiny size to which those characters are shrunk on display 112. In order to permit more adequate viewing of a document on display 112, device 200 can enable magnification of user-selected portions of the document, such that a single document portion (rather than the entire document) occupies the entirety (or near-entirety) of display 112 at any given moment, but that document portion is magnified on display 112 beyond the level of magnification at which that portion would be seen if the entire document occupied display 112. For example, in response to detecting a user-produced "spreading" gesture relative to touch-screen display 112, in which two fingertips contact display 112 initially close together and then spread apart from each other while contact against display 112 is maintained, device 200 can zoom-in on a document portion that is centered at, or that includes, the point at which the gesture was made.

Zooming in effectively decreases the size of a viewing window relative to the entire document, so that only the portion of the document that falls within the bounds of the viewing window is presented on display 112 at any particular moment. Since the content within the viewing window is expanded to occupy all (or nearly all) of the area of display 112, a decreased viewing window size produces a magnified view of the content within the viewing window.

Traditionally, in order to navigate to another portion of the document while the document remained magnified, a user would make another gesture relative to touch-screen display 112. For example, the user might place one fingertip against display 112 and drag the fingertip in a particular direction while maintaining contact with display 112. Such a dragging gesture would pull the viewing window across the document in the direction of the dragging gesture, so that different portions of the document would become visible on display 112 as the position of the viewing window relative moved relative to the whole document. This document navigation technique, although permitting the view to remain magnified, is relatively slow and cumbersome, often requiring repeated fingertip repositioning and dragging across display 112 in order to reach the desired portions of the document. Yet the traditional alternative was for the user to exit the zoomed-in mode (e.g., by making a "pinching" gesture relative to display 112) in order to view the entire document once again, and then to select a new portion of the document on which to zoom-in again. Although this alternative could potentially allow the user to navigate to a distant portion of the document more quickly than if he had kept device 200 in zoomed-in mode constantly throughout the navigation, users can find aggravating the need to repeatedly zoom in on and zoom out from various portions of a document.

This aggravation can be especially acute when the document that the user is viewing has some internal structure that the user naturally would want to follow when viewing various portions of the document. For example, a news document might include multiple vertical columns of text all on the same page, aligned side-by-side with each other. The text that ends the bottom of the one column typically will pick up at the top of the next column to the right (assuming that the document is written in English or another similar language). In this case, the user can find it cumbersome to zoom out after reaching the bottom of each column in order to zoom in on the top of the next column. The user can find it similarly cumbersome to remain in zoomed in mode and slowly drag the viewing window from the bottom of one column to the top of the next column.

Embodiments of the invention can take advantage of cases in which a document has a known structure, such that a user's navigation from one portion of the document is likely to be followed by the user's navigation to another (potentially distant) portion of the document. In an embodiment, device 200 automatically determines the structure and corresponding navigational flow of a document. For example, device 200 may determine automatically that a particular document has four columns, and that, in a left-to-right order, the bottom of one column is navigationally followed by the top of the next column. In part, the direction of the navigational flow may be assumed based on language and printing conventions that dominate the region from which the document originates.

In an embodiment, device 200 can enter zoomed-in mode in response to a particular user-produced gesture (e.g., the "spreading" gesture discussed above) relative to touch-screen display 112. Device 200 can remain in the zoomed-in mode until some other specific gesture, especially meant to exit the zoomed-in mode, is detected against touch-screen display 112. While in the zoomed-in mode, device 200 can interpret user-produced gestures against touch-screen display 112 differently than device 200 would interpret those gestures while not in the zoomed-in mode, such that device 200 can give those gestures different meanings and such that device 200 can react differently to those gestures. The new zoomed-in mode meanings given to such gestures can be used to cause device 200 to navigate to different portions of the document relatively quickly based on the document's automatically determined structure and navigational flow. During such navigation, device 200 can maintain a magnified view of the document without ever zooming out. In certain embodiments, although the view can remain magnified all the while that device 200 remains within the zoomed-in mode, the level of magnification can differ as different portions of the document are viewed, without returning to the presentation of the document as a whole.

For example, while a document is being viewed in zoomed-out mode, such that an entire page is visible on display 112, a certain gesture such as a lengthy fingertip swipe across display 112 can cause device 200 to perform one type of action, but while a portion of that document is being viewed in zoomed-in mode, such that only that portion of the page is visible on display 112, that same gesture can cause device 200 to perform a different type of action. The action that device 200 performs in response to a swipe while in zoomed-out mode might be to display a different document in a document collection or, if there is no document collection, to do nothing at all. However, the action that device 200 performs in response to that same swipe while in zoomed-in mode might be to navigate to the next portion of the document that follows the currently displayed portion according to the document's navigational flow.

In an embodiment, the portion of the document to which device 200 navigates while in the zoomed-in mode is the portion that either immediately precedes or immediately follows the currently presented portion in the navigational flow. The various portions into which the document is divided (e.g., columns) can be ordered relative to each other such that the portions form a sequence within the navigational flow. For example, a first column can be followed by a second column, which can be followed by a third column, which can be followed by a fourth column. While device 200 is in zoomed-in mode and zoomed-in on the first column, a right-ward swipe gesture can cause device 200 to zoom-in on the second column. While device 200 is in zoomed-in mode and zoomed-in on the second column, a right-ward swipe gesture can cause device 200 to zoom-in on the second column, while a left-ward swipe gesture can cause device 200 to zoom-in on the first column. While device 200 is in zoomed-in mode and zoomed-in on the third column, a right-ward swipe gesture can cause device 200 to zoom-in on the third column, while a left-ward swipe gesture can cause device 200 to zoom-in on the second column. While device 200 is in zoomed-in mode and zoomed-in on the fourth column, a left-ward swipe gesture can cause device 200 to zoom-in on the third column.

According to an embodiment, the level of magnification at which device 200 presents a portion of the document while in zoomed-in mode is based on the dimensions of that portion. In an embodiment, device 200 magnifies each portion to an extent that automatically causes that portion's width to occupy the entire, or some specified area of, display 112. For example, while presenting a first column, device 200 may increase the level of magnification so that the first column's width is as wide as display 112, and while presenting a second column, device 200 may increase the level of magnification so that the second column's width is as wide as display 112—even if those widths differ from each other. In alternative embodiments, the level of magnification can be adjusted automatically to allow the full height of a currently presented portion (e.g., a column) to be shown on display 112, even if the full width of that portion falls beyond the viewing window's boundaries. In yet other embodiments, the level of magnification can be adjusted automatically to allow a complete object within the document to be shown on display 112, such that no portions of that object fall outside of the viewing window, but without regard to the display of any other object within the document.

In an embodiment, not only can device 200 navigate to the immediately preceding or following portion of a document in a navigational flow in response to detecting a certain type of gesture while in zoomed-in mode, but device 200 can additionally navigate to a certain endpoint of that preceding or following portion, such as the beginning or top of the immediately following column or the ending or bottom of the immediately preceding column. For example, in response to detecting a left-ward swipe gesture while displaying a magnified view of a second column of a document while in zoomed-in mode, device 200 can navigate to and present a magnified view of the bottom or ending of the first column (since that would be the part of the first column most immediately preceding the second column as a whole). For another example, in response to detecting a right-ward swipe gesture while displaying a magnified view of the second column of the document while in zoomed-in mode, device 200 can navigate to and present a magnified view of the top or beginning of the third column (since that would be the part of the third column most immediately following the second column as a whole). Thus, while in one embodiment a swipe in a particular direction can cause device 200 to navigate to the closest next portion of the document in that direction, while staying at an equivalent latitude or longitude relative to that next portion (depending on the swipe's direction), in another embodiment, the navigation involves both a latitudinal and longitudinal motion.

Figure 14:
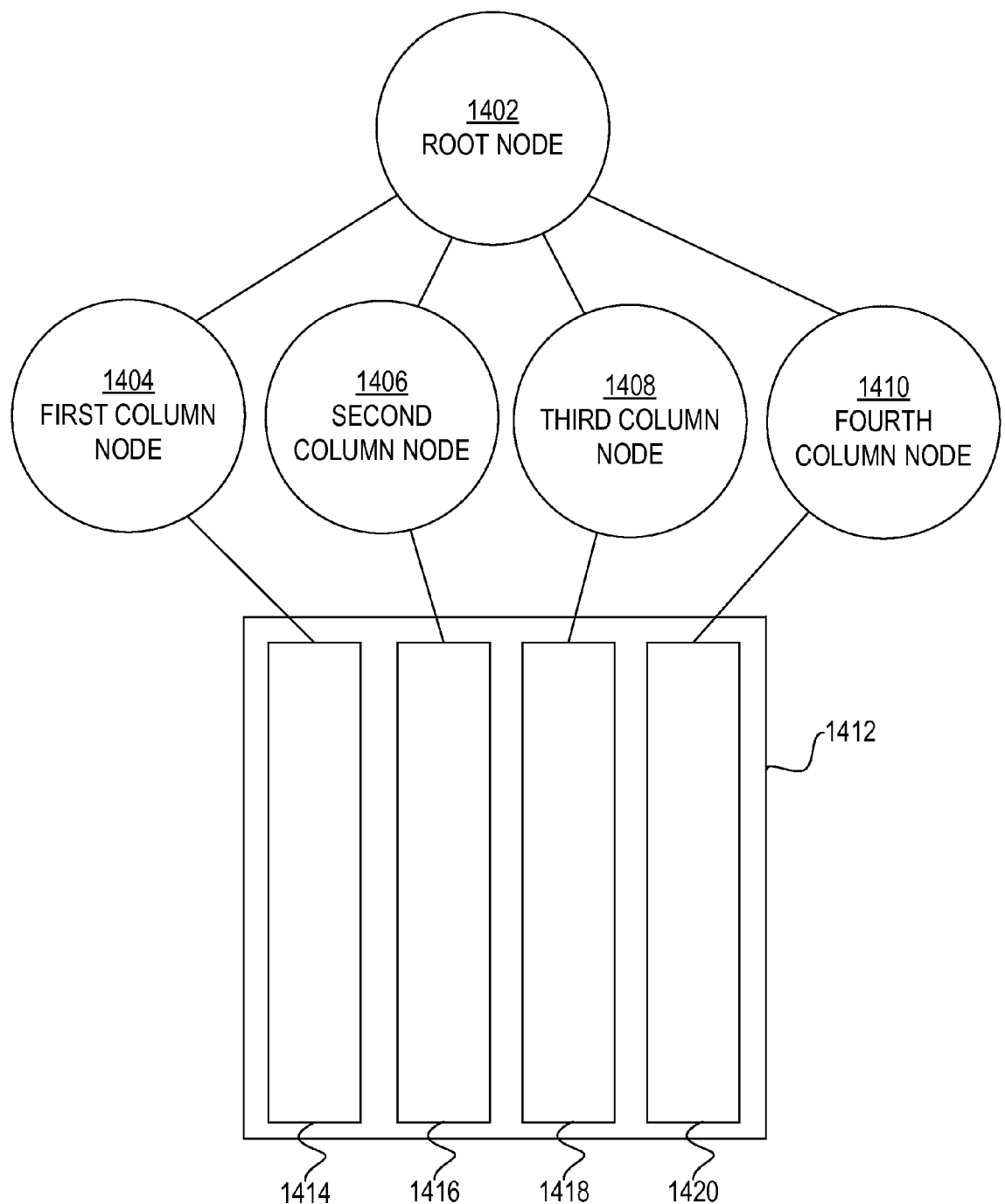
FIG. 14 is a diagram that conceptually illustrates a navigational flow tree structure that is created based on the internal structure of a document, according to an embodiment of the invention.

In an embodiment, device 200 (or some other computing node) automatically decomposes a document into separate portions or objects, thereby creating the navigational flow. For example, device 200 can automatically detect, on a page, spaces between columns and/or paragraphs in order to separate components of the pages into separate portions or objects. If the page is marked with tags from some mark-up language such as a language that is a subset of Extensible Markup Language (XML)—Hypertext Markup Language (HTML) is such a subset—then these tags can be used to automatically determine demarcations between portions of the document and/or distinct objects contained in the document. These portions can be related to each other in the navigational flow based at least in part on the spatial relations of those portions relative to each other on the document. In an embodiment, the decomposition of the document involves the creation of a tree structure, in which each portion or object corresponds to a node of the tree. FIG. 14 is a diagram that conceptually illustrates a navigational flow tree structure that is created based on the internal structure of a document, according to an embodiment of the invention.

FIG. 14 shows a document 1412 that includes vertical columns 1414-1420. Each of vertical columns 1414-1420 can include multiple lines of text. Each line of text can be read from left to right, and lines of text within a column can be read from top to bottom. The entire text of document 1412 begin at the top left of column 1414. The text ending at the bottom right of column 1414 resumes at the top left of column 1416. The text ending at the bottom right of column 1416 resumes at the top left of column 1418. The text ending at the bottom right of column 1418 resumes at the top left of column 1420. The entire text of document 1412 ends at the bottom right of column 1420. In an embodiment, the navigational structure of document 1412 is represented as a tree. An automatic computer-implemented process can determine and locate the distinct portions of the document. In this example, each of columns 1414-1420 is a automatically determined to be a separate document portion. Thus, nodes 1404-1410 are created within the tree for columns 1414-1420, respectively. The navigational relationships between the columns can be inferred from their spatial relationship to each other as well as the linguistic and printing customs of the language in which document 1412 is composed. In this example, columns 1414-1420 are known to be readable from left to right, and so, therefore, when the tree is created, nodes 1404-1410 are placed in left-to-right order within the same level of the tree, that being the second level. Nodes 1404-1410 are placed at the same level of the tree because columns 1414-1420 are hierarchically equal to each other, with no particular column being hierarchically superior to any other; no particular column is contained within any other column. At the first level of the tree is root node 1402, which is a parent node to each of nodes 1404-1410. Root node 1402 represents document 1412 as a whole. The navigational flow, and the sequence of the portions of document 1412 to be followed during zoomed-in navigation, can be derived from the tree, which is in turn derived from the organizational structure of document 1412.

According to an embodiment, when navigation is performed in response to a user gesture while the device is in zoomed-in mode, a breadth-first traversal of the tree of nodes at the same level as the node corresponding to the currently displayed portion can be performed in order to determine the next portion of the document to be displayed in a magnified manner. Thus, if a magnified view of a part of column 1416 is currently being presented on the device's display, then corresponding node 1406 can be used as the base node from which navigation is to proceed in response to the device detecting a swipe gesture while the device is in the zoomed-in mode. A leftward swipe gesture can cause the device to present a magnified view of column 1414, since a leftward breadth-first traversal of the tree from node 1406 most immediately finds node 1404 at the same level of the tree. Similarly, a rightward swipe gesture can cause the device to present a magnified view of column 1418, since a rightward breadth-first traversal of the tree from node 1406 most immediately finds node 1408 at the same level of the tree. In switching between presentations of magnified view of the various different ones of columns 1414-1420, the device does not ever need to zoom out to a view of document 1412 as a whole.

Although the example shown in FIG. 14 relates to a tree possessing only two levels, in various alternative embodiments, a tree can possess three or even more levels. For example, a document or page might contain a collection of distinct pictures (e.g., contained in separate frames) located at various places on the page. For each of these pictures, a separate node could be placed at a second level of the tree. Each of the pictures in the document might depict multiple objects. For each such object within a particular picture, a separate node for that object could be placed at a third level of the tree as a child node of the node corresponding to the particular picture in which that object is contained. While the device is presenting the document as a whole, the device can detect user input that causes the device to enter zoom-in mode at the second level of the tree. Swipe gestures received while in zoom-in mode at the second level can cause the device to navigate to and present magnified views of the different pictures corresponding to the nodes at the tree's second level; each such picture can be magnified at an appropriate level (e.g., at the highest level of magnification possible while still showing the whole picture) when the device navigates to that picture. Furthermore, while the device in presenting a particular picture as the device is in zoom-in mode at the second level of the tree, the device can detect user input that causes the device to enter zoom-in mode at the third level of the tree. Swipe gestures received while in zoom-in mode at the third level can cause the device to navigate to and present magnified views of the different objects corresponding to the nodes at the tree's third level, beginning at least with the objects that are in the particular picture since those objects correspond to child nodes of the particular picture's node; each such object can be further magnified at an appropriate level (e.g., at the highest level of magnification possible while still showing the whole object) when the device navigates to that object. In one embodiment, the device's detection of another specified user input can cause the device to zoom-out to the next higher level of the tree.

Figure 15:
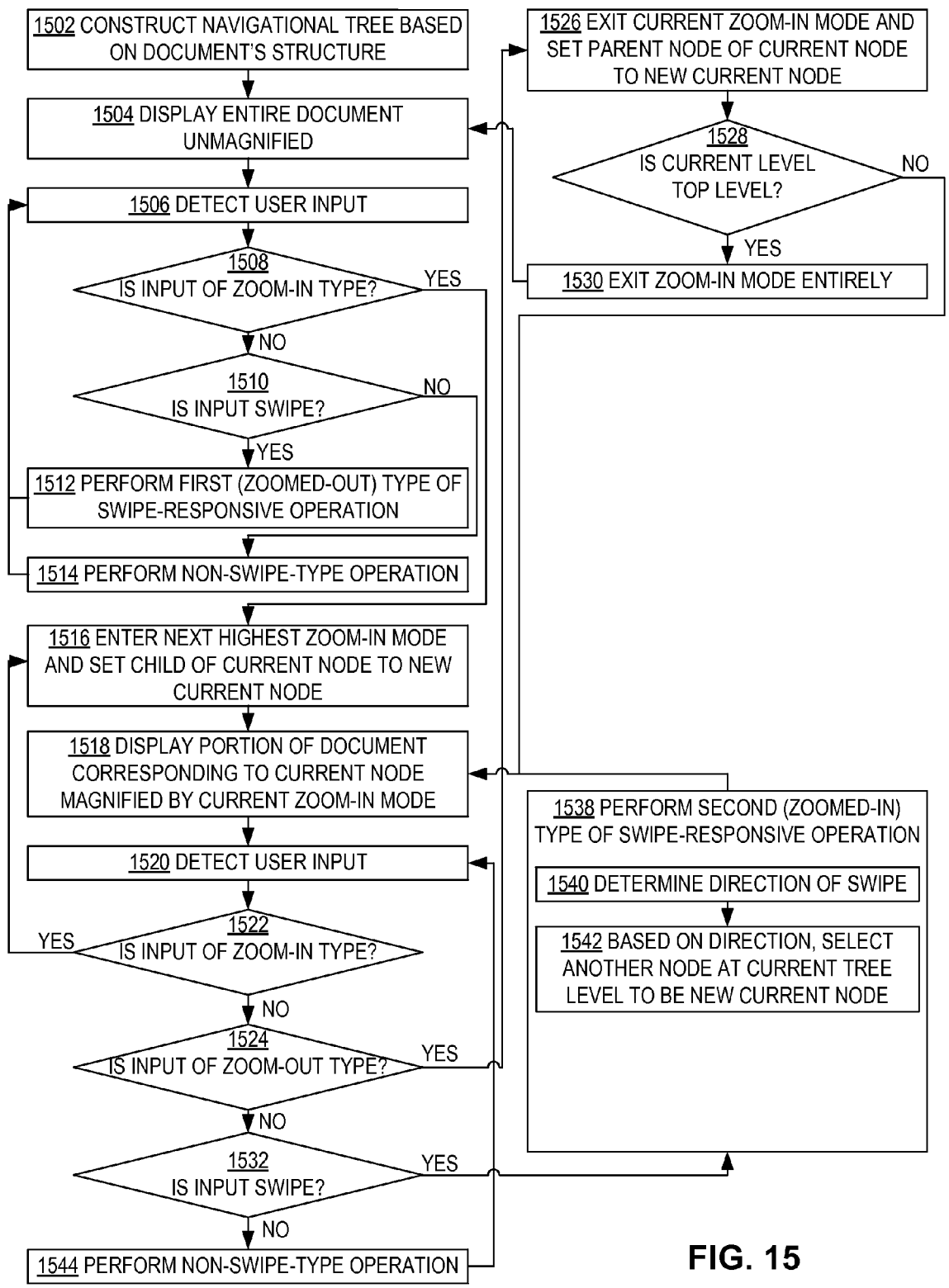
FIG. 15 is a flow diagram illustrating an example technique for navigating in between portions of a document in response to gestures made while in a zoom-in mode, according to an embodiment of the invention.

FIG. 15 is a flow diagram illustrating an example technique for navigating in between portions of a document in response to gestures made while in a zoom-in mode, according to an embodiment of the invention. Although certain operations are shown as being performed in a certain order relative to each other, variants of the technique can involve additional, fewer, or different operations being performed potentially in a different order. The technique begins at block 1502. In block 1502, a navigational tree can be automatically constructed based on the structure of a document. The root node of the tree can be set to be the current node of the tree. The top, or first, level of the tree can be set to be the current level of the tree.

In block 1504, a device can display the entire document in an unmagnified manner. In block 1506, the device can detect user input relative to the device. In block 1508, the device can determine whether the user input is of a type that causes the device to enter the first level of zoom-in mode, corresponding to the second level of the tree. If the user input is of the type that causes the device to enter the first level of zoom-in mode, then control passes to block 1516. Otherwise, control passes to block 1510.

In block 1510, the device can determine whether the user input is a swipe type of gesture. If the user input is a swipe type of gesture, then control passes to block 1512. Otherwise, control passes to block 1514.

In block 1512, the device can perform a first type of operation that is mapped to a swipe gesture performed outside of a zoomed-in mode. As will be seen from the discussion below, this first type of operation can differ from a second type of operation that is mapped to a swipe gesture performed within a zoomed-in mode. Alternatively, the device can perform no operation at all. Control passes back to block 1506.

Alternatively, in block 1514, the device can perform an operation that is mapped to the particular non-swipe type of gesture detected. Control passes back to block 1506.

Alternatively, in block 1516, the device can enter the next highest level of zoom-in mode. The next level of the tree deeper than the current level can become the new current level. A child of the current node can become the new current node.

In block 1518, the device can display a magnified document portion corresponding to a current node at a level of the tree corresponding to the current level of zoom-in mode.

In block 1520, the device can detect user input relative to the device. In block 1522, the device can determine whether the user input is of a type that causes the device to enter a next highest level of zoom-in mode. If the user input is of the type that causes the device to enter the next highest level of zoom-in mode, and if the current node has a child node, then control passes back to block 1516. Otherwise, control passes to block 1524.

In block 1524, the device can determine whether the user input is of a type that causes the device to exit (i.e., zoom-out from) the current level of zoom-in mode. If the user input is of the type that causes the device to exit (i.e., zoom-out from) the current level of zoom-in mode, then control passes to block 1526. Otherwise, control passes to block 1532.

In block 1526, the device can exit the current level of zoom-in mode. The next level of the tree shallower than the current level can become the new current level. The parent of the current node can become the new current node. For example, if the device is at the second level of zoom-in mode, then the device can enter the first level of zoom-in mode. In block 1528, the device can determine whether the current level of the tree is the first (i.e., top) level. If the current level of the tree is the first (i.e., top) level, then control passes to block 1530. Otherwise, control passes back to block 1518.

In block 1530, the device can exit zoom-in mode; the device is no longer in any zoom-in mode at all. Control passes back to block 1504.

In block 1532, the device can determine whether the user input is a swipe type of gesture. If the user input is a swipe type of gesture, then control passes to block 1538. Otherwise, control passes to block 1544.

In block 1538, the device can perform a second type of operation that is mapped to a swipe gesture performed within a zoomed-in mode. As was mentioned above, this second type of operation can differ from the first type of operation that is mapped to a swipe gesture performed outside of a zoomed-in mode. In an embodiment, as part of performance of the second type of operation, the device can perform the actions of blocks 1540-1542. In block 1540, the device can determine a direction of the swipe gesture. For example, the device might determine that the swipe gesture is primarily made in a leftward or a rightward direction. In block 1542, the device can select, as a new current node, another node at the same level of the tree as the current node. For example, the device can select, as the new current node, a sibling of the current node, if the current node has a sibling, or a "cousin" of the current node at the current level if the current node has no sibling. The device can select the new current node based at least in part on the direction determined in block 1540. For example, if the direction was leftward, then the device can select, as the new current node, the sibling or cousin node to the left of the current node at the current level of the tree (potentially "cycling around" to the rightmost sibling or cousin node at the current level if the current node is already the leftmost node at the current level). For another example, if the direction was rightward, then the device can select, as the new current node, the sibling or cousin node to the right of the current node at the current level of the tree (potentially "cycling around" to the leftmost sibling or cousin node at the current level if the current node is already the rightmost node at the current level). Control passes back to block 1518.

Alternatively, in block 1544, the device can perform an operation that is mapped to the particular non-swipe type of gesture detected. Control passes back to block 1520.

Figure 4:
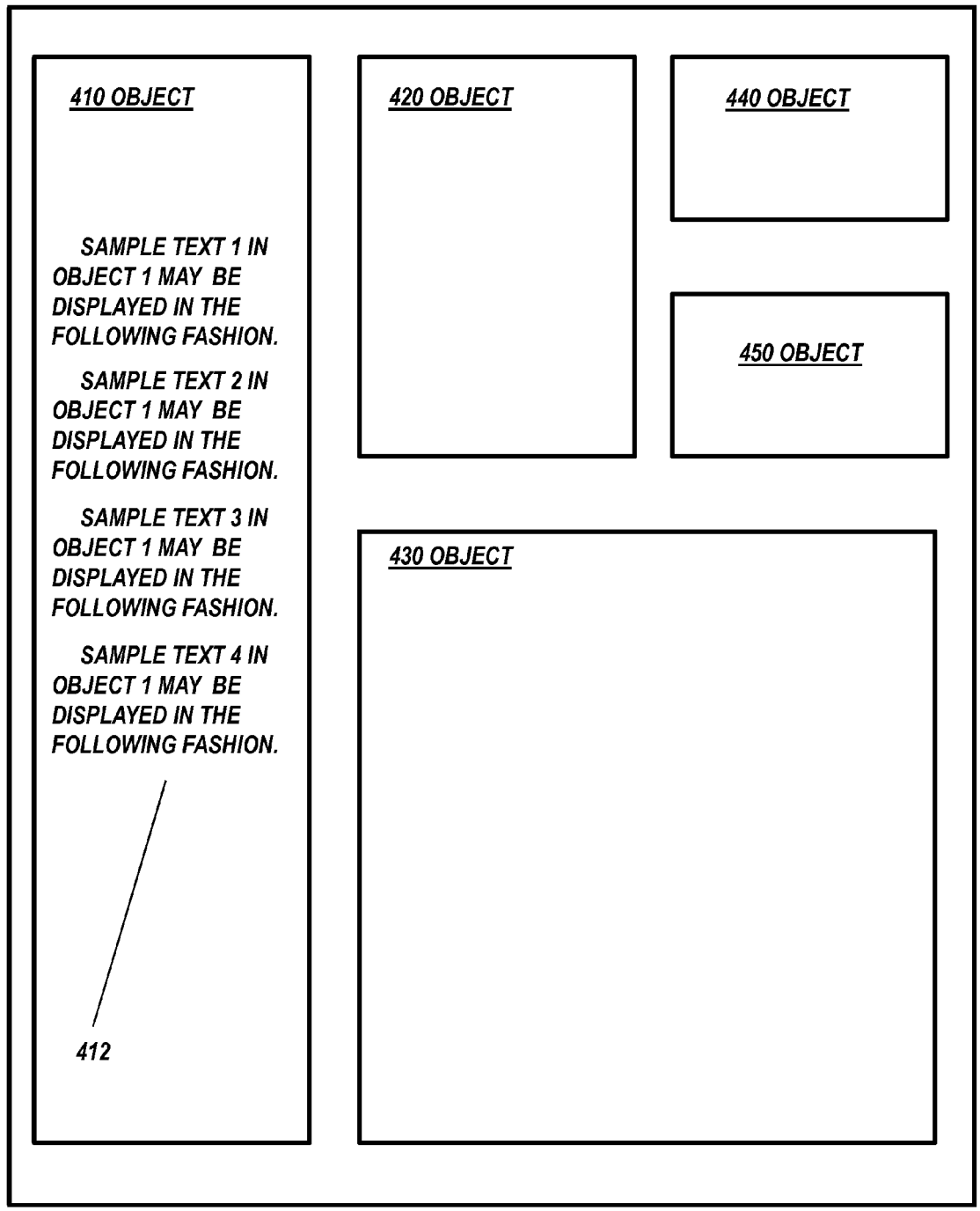
FIG. 4 is a representation of a page containing objects displayable in an electronic device.

Content in an electronic device can be organized in pages. FIG. 4 illustrates a page 400 comprising five content objects, 410, 420, 430, 440, and 450. The objects can be of various types, e.g., text, photo, embedded video, as known by those of skill in the art, and can contain one or more hyperlinks to other content. Sample text 412 is shown in object 410 comprising four paragraphs.

One example of content in a page is a web page. A web page, typically in HyperText Markup Language (HTML) format may include other resources such as style sheets, scripts and images into the presentation of the page. A web page may include objects of static text and other content stored in a web server (static web pages), or may be constructed when they are requested (dynamic web pages).

Figure 5:
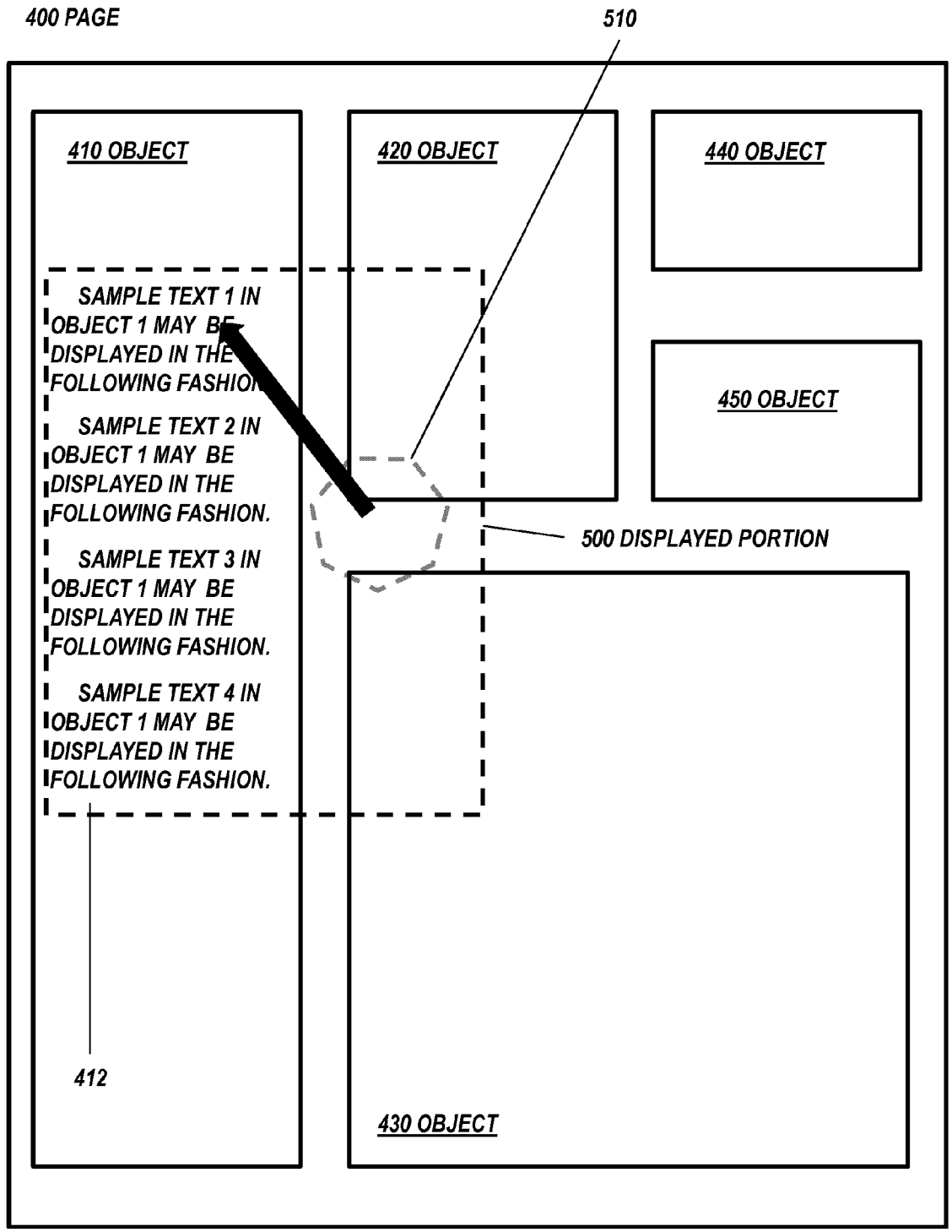
FIG. 5 is a representation of a page containing objects displayable in an electronic device, a displayed portion of the page, and a received gesture.

The display of an electronic device may be limited in the portion of a page that can be displayed in a usable fashion, e.g., with text of sufficient size for reading, with photos of sufficient size to reveal detail. FIG. 5 illustrates the portion 500 of a page 400 that can be displayed in a useable fashion on the display of an electronic device. Notice that all of sample text 412 is within the displayed portion 500.

In electronic devices with touch-sensitive surfaces for receiving gesture input as described above, a single finger gesture 510 received while displaying portion 500 may result in currently-displayed portions of object 410 no longer being displayed. Gesture 510 is illustrated as a touch point (the heptagon) and movement (the arrow). For example, in FIG. 6 wherein displayed page portion 600 results from single finger gesture 510, the sample text 412 is not entirely readable. In fact, gesture 510 that results in displayed portion 600 leaves no objects of page 400 entirely readable.

Figure 6:
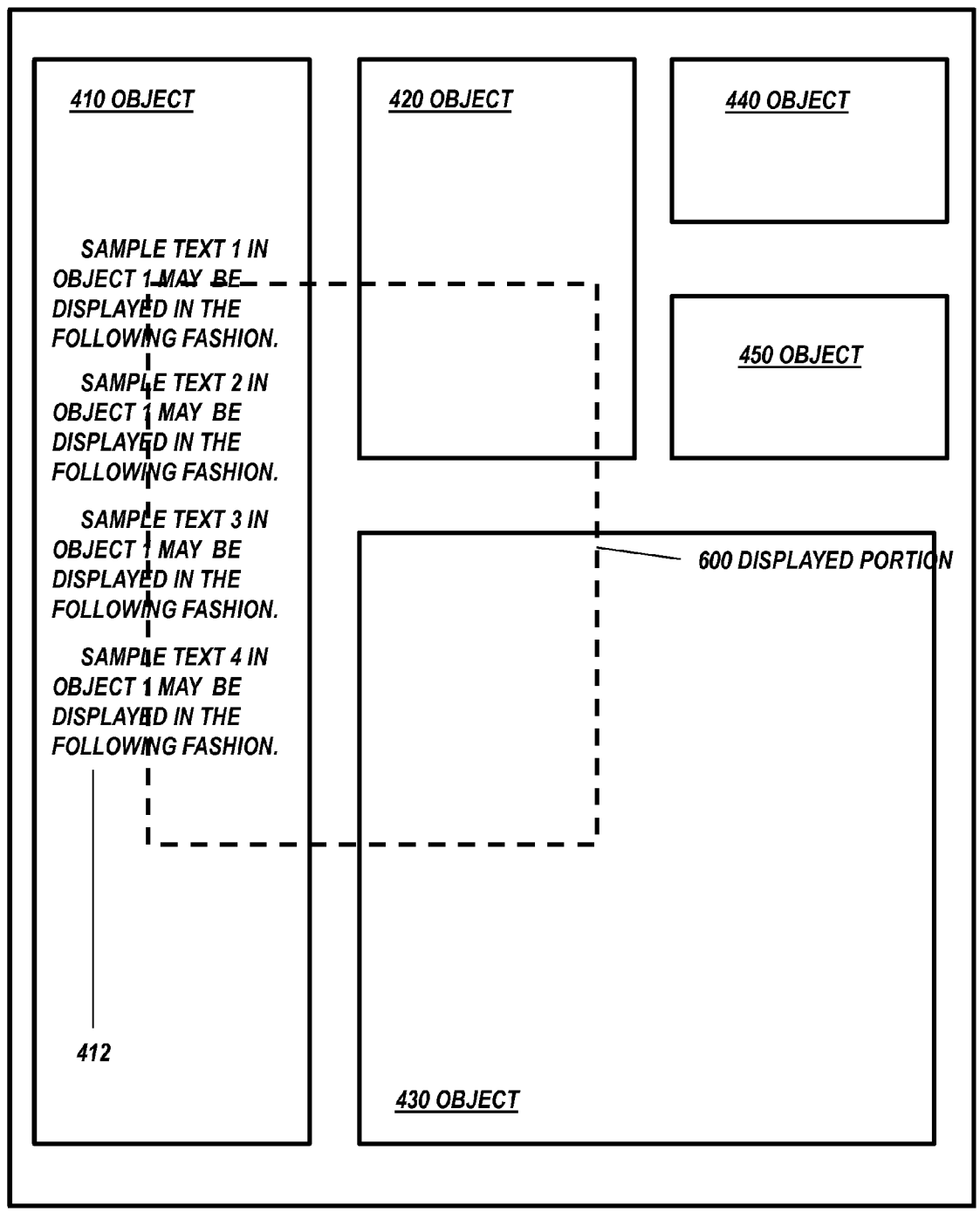
FIG. 6 is a representation of a page containing objects displayable in an electronic device, a displayed portion of the page as a result of the received gesture of FIG. 5.

For some content, it may be preferable that either the whole object (e.g., a map of directions) or some useful portion of the object (e.g., several entire lines of text from one or more paragraphs) be displayed. In such circumstances, the situation illustrated in FIG. 6 is not desirable. Embodiments of the present technology include computer-implemented methods, computer program products, and devices that can allow a user to interact through gestures with content presented as objects in a page in a more useful fashion than as described in reference to FIG. 6.

Figure 7:
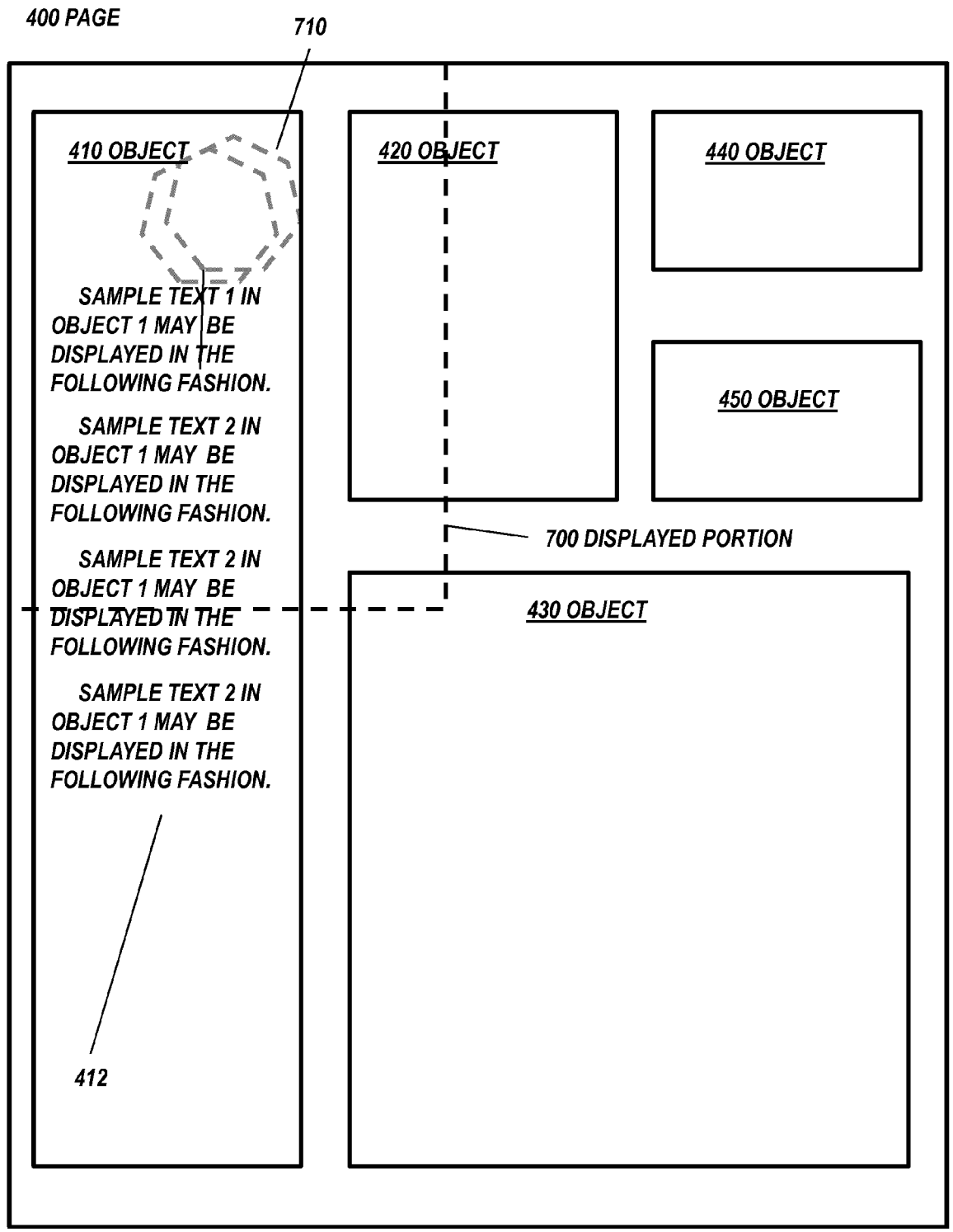
FIG. 7 is a representation of a page containing objects displayable in an electronic device, a displayed portion of the page, and a received gesture.

Referring to FIG. 7, displayed portion 700 displays the entire width of object 410, only a portion of the width of object 420, and only a small portion of the top left corner of object 430. In this displayed portion 700, the upper portion of object 410 is displayed for a user to read.

Figure 8:
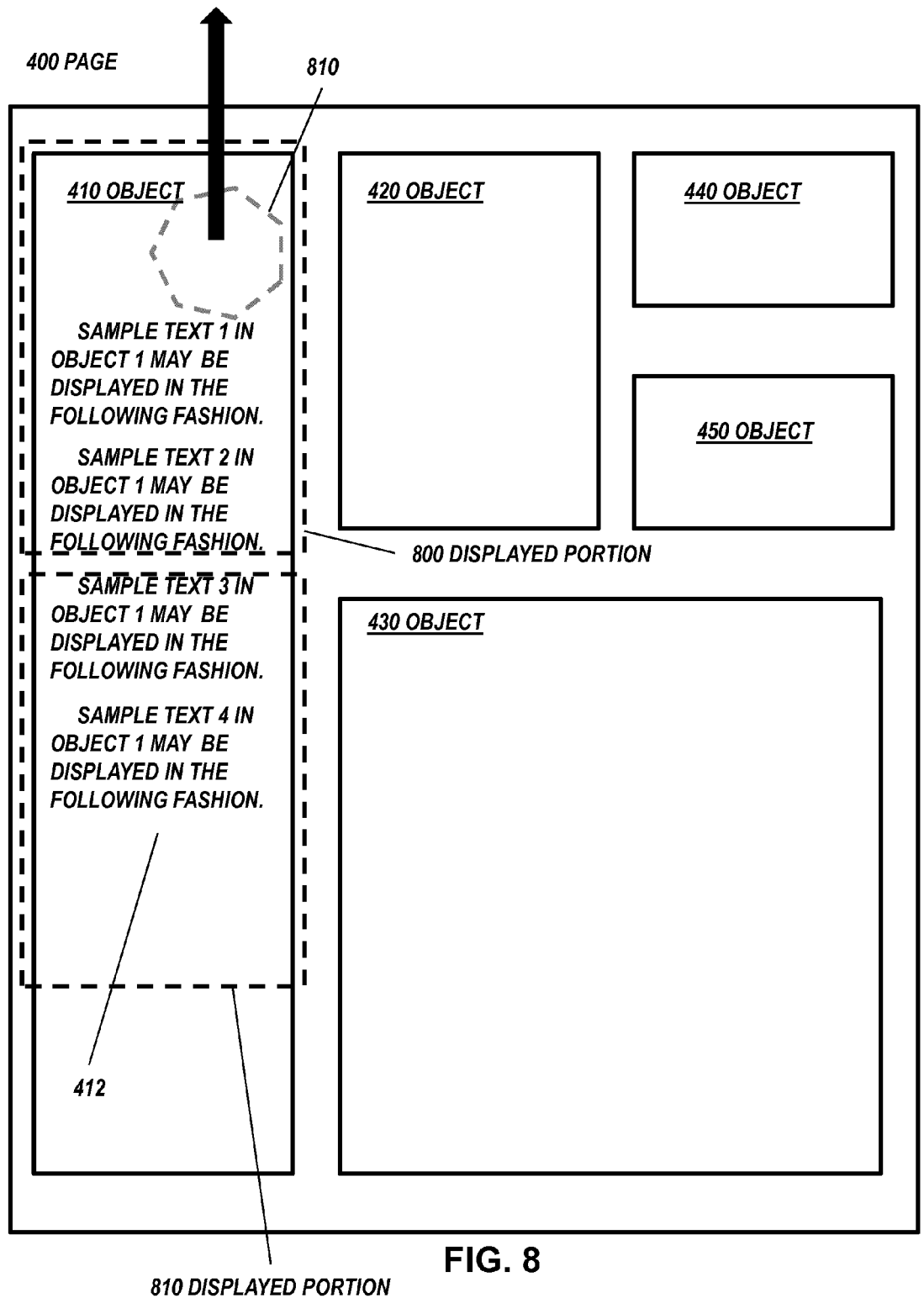
FIG. 8 is a representation of a page containing objects displayable in an electronic device, a first displayed portion of the page, a received gesture, and a second displayed portion of the page as a result of receiving the gesture.

As known to those of skill in the art, in some electronic devices, a double tap gesture 710 to the touch screen within the area of object 410 can cause the display to zoom-to-width of the object, e.g., as shown in FIG. 8 as displayed portion 800. Displayed portion 800 allows a user to read all of the first two paragraphs of sample text 412. Note that displayed portion 800 is shown slightly larger than the margins of object 410 for visual clarity, not to indicate an offset between object 410 and displayed portion 800.

Typically, a user reading object 410 and desiring to continue reading past the second paragraph uses a single finger gesture, e.g., gesture 810, in order to see displayed portion 820 and read the third and fourth paragraphs of sample text 412.

Figure 9:
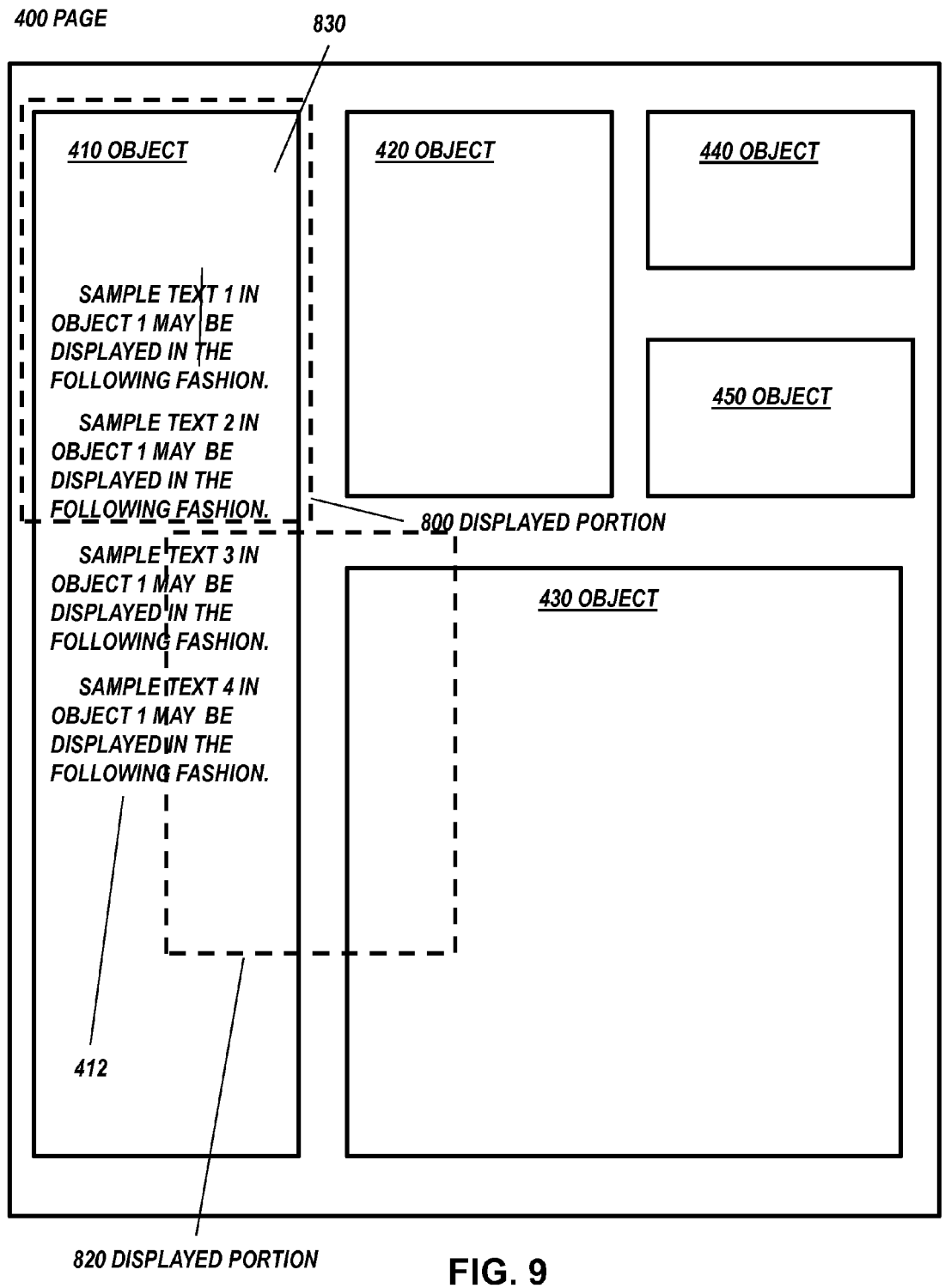
FIG. 9 is a representation of a page containing objects displayable in an electronic device, a first displayed portion of the page, a received gesture, and a second displayed portion of the page as a result of receiving the gesture.

However, as also illustrated in FIG. 6, the user may inadvertently perform gesture 830 as shown in FIG. 9, which may result in displayed portion 840, in which the third and fourth paragraphs of sample text 412 are not entirely visible.

Figure 10:
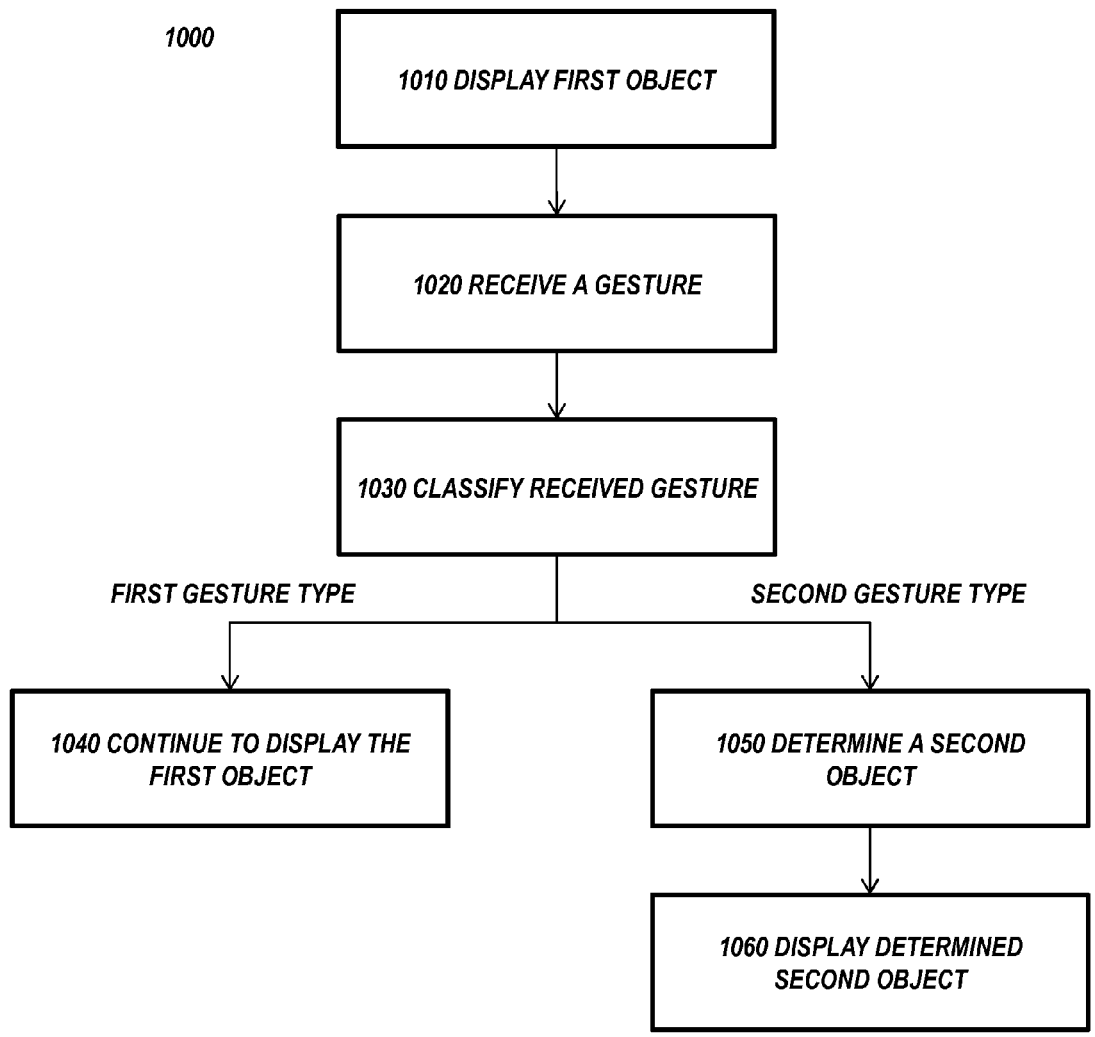
FIG. 10 is a flow chart illustrating methods in accordance with the present technology.

Referring to FIG. 10, methods of the present technology that address the situation described with respect to FIG. 6 and FIG. 9 are illustrated in a flow chart 1000. An electronic device displays a first object 1010, such as first object 410 shown in display portion 800 as displayed zoomed-to-width with no offset (offset being the difference between a reference point in the display window—typically the top left corner—and a similar reference point in the object—typically the top left portion of the object).

The device receives a gesture 1020. In embodiments of the present technology, the received gesture is classified as either a first gesture type or a second gesture type 1030. Gesture classification can be based on gesture attributes such as gesture origin, gesture direction, gesture length, gesture duration, gesture position on the display, and gesture position in the context of the displayed portion of the page. Gesture direction can be measured as an angle from a reference direction. Gesture velocity can be measured directly, or can be derived from gesture length and gesture duration.

For example, gestures can be classified as either "small" or "large" based on a combination of the percentage of the display width that the gesture traverses and the velocity of the gesture. For example, each gesture with gesture length at least as long as 10% of the display width, and with gesture velocity of at least one screen width per second can be classified as a large gesture; while gestures not classified as large can be classified as small.

Other gesture classification schemes can be used, e.g., whether the largest component dimension of the gesture is horizontal or vertical, whether the gesture is single finger or multi-finger.

Weighted vectors of gesture attributes can be used to classify gestures. For example, a large gesture can be any gesture having a weighted attribute vector magnitude of 20 or more where gesture weighted attribute vector is given by $w_1a_1+w_2a_2+\ldots w_na_n$. For example, for attributes $a_1$=gesture length as percentage of display width, and $a_2$=gesture velocity (screen widths/second), and weights $w_1$=1 and $w_2$=10, a gesture crossing 10% of the display at a rate of one screen width per second would have a weighted gesture attribute vector magnitude of 20 and be considered a large gesture. A gesture crossing 20% of the display, but doing so at a rate of 0.5 screen widths/second would have a weighted gesture attribute vector magnitude of 10, and be considered a small gesture.

For a gesture classified as a first type, embodiments of the technology can continue to display the first object 1040. Note that this does not necessarily mean that the first object remains in the same position in the display. In some embodiments, continuing to display the first object includes inhibiting the effect of the received gesture on at least one aspect of the display. For example, where the first object is zoomed-to-width on the display, and a diagonal single finger gesture is received and is classified as small, the technology can inhibit horizontal scrolling, continuing to display the full width of the first object, but keeping any vertical component of the received gesture and scrolling vertically based on such vertical component.

For a gesture classified as a second type, embodiments of the technology determine a second object to display based on the gesture and model of the page 1050. The technology then displays the determined second object 1060. Displaying the determined second object can include displaying the determined second object as zoomed-to-width and with no offset.

Figure 11:
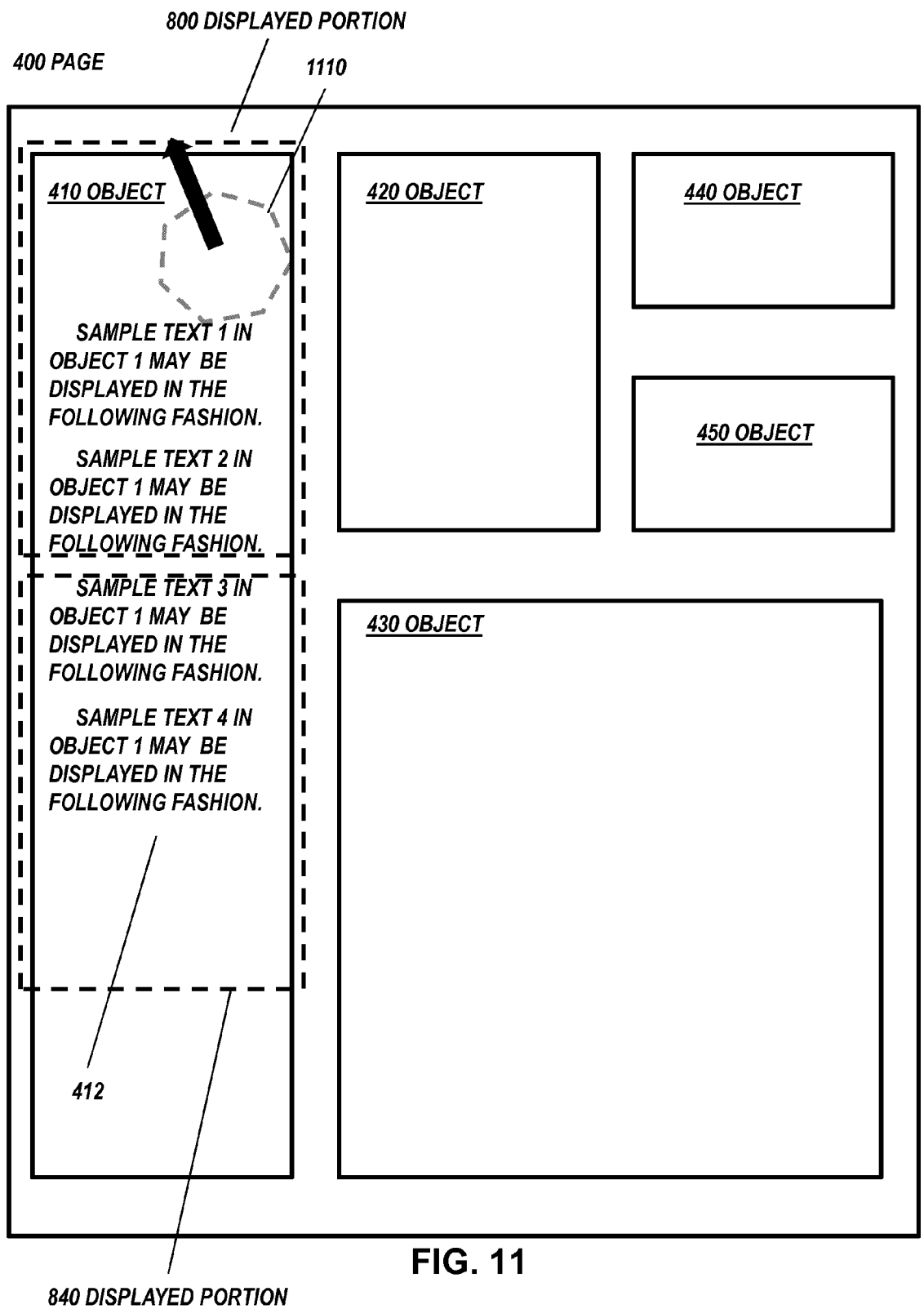
FIG. 11 is a representation of a page containing objects displayable in an electronic device, a first displayed portion of the page, a received gesture, and a second displayed portion of the page as a result of receiving the gesture.
Figure 12:
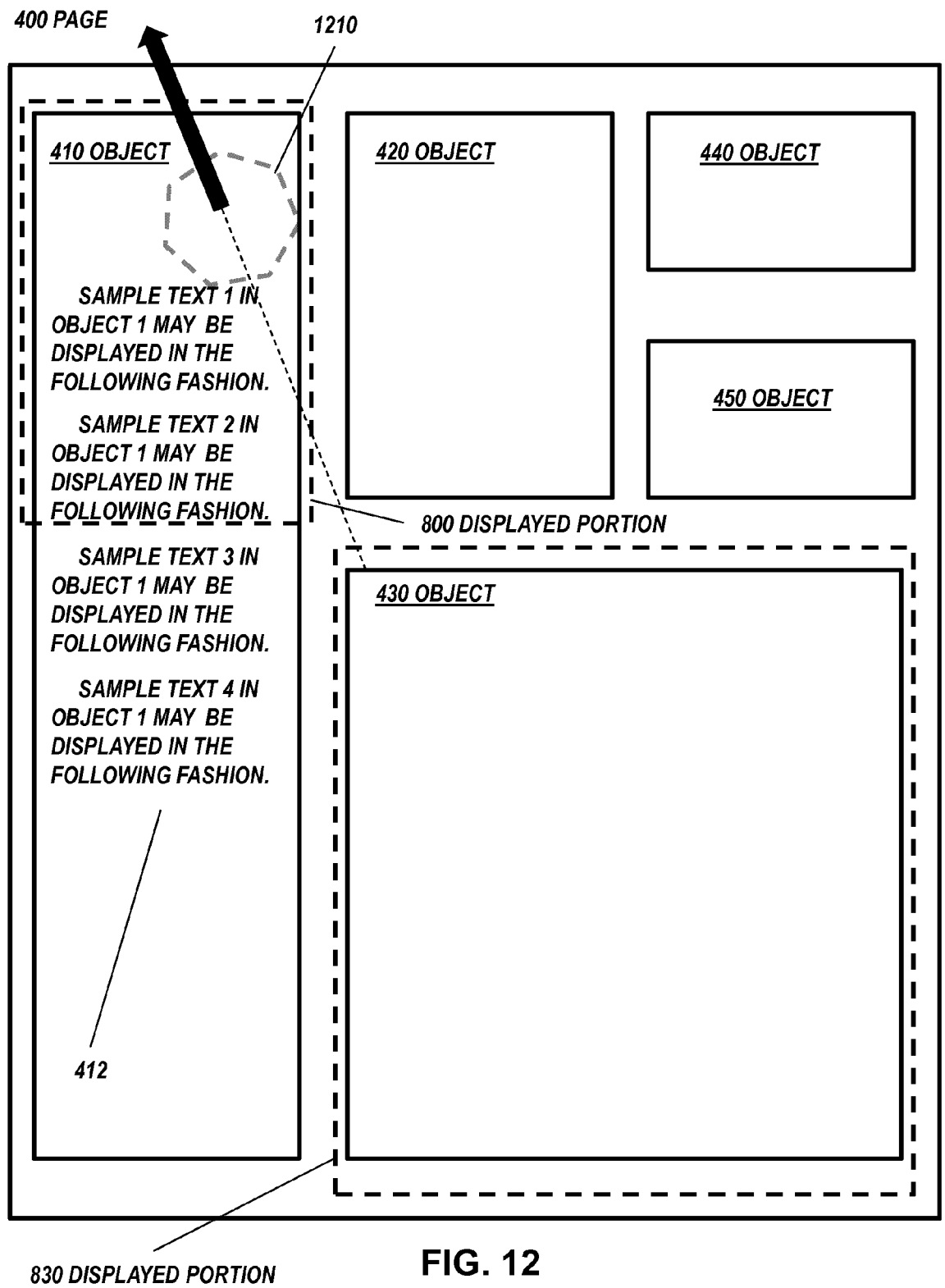
FIG. 12 is a representation of a page containing objects displayable in an electronic device, a first displayed portion of the page, a received gesture, and a second displayed portion of the page as a result of receiving the gesture.
Figure 13:
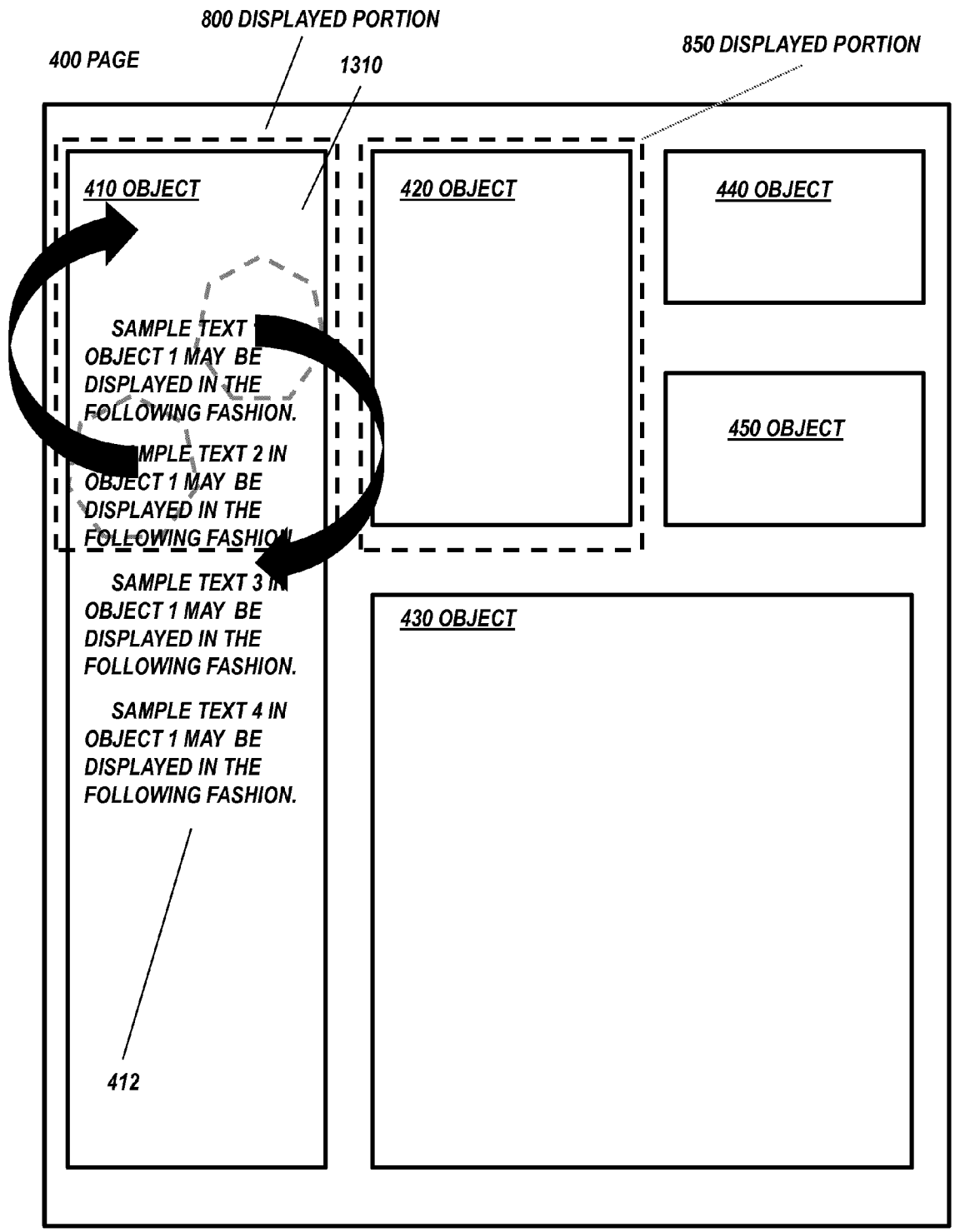
FIG. 13 is a representation of a page containing objects displayable in an electronic device, a first displayed portion of the page, a received gesture, and a second displayed portion of the page as a result of receiving the gesture.

FIGS. 11-13 illustrate examples of the technology applied to page 400. In FIG. 11 while display portion 800 showing first object 410 zoomed-to-width and with no offset is displayed, the electronic device receives gesture 1110. Embodiments of the technology classify gesture 1110 as a small gesture based on its length and velocity (velocity not indicated in FIG. 11). In accordance with the illustrated embodiment, when a received gesture is classified as small, the technology continues to display the first object, here object 410, and inhibits the response of the display to the horizontal component of the gesture 1110. This results in the display showing display portion 840 of object 410 which is zoomed-to-width and vertically offset to display the third and fourth paragraphs of sample text 412.

In FIG. 12, while display portion 800 showing object 410 zoomed-to-width and with no offset, the electronic device receives gesture 1210. Embodiments of the technology classify gesture 1210 as a large gesture based on its length and speed (speed not indicated in FIG. 11). In accordance with some embodiments of the present technology, when a received gesture is classified as large, the technology determines a second object to display. In the embodiments illustrated by FIG. 12, the second object to display according to the page model is object 430. The page model for page 400 indicates that object 430 is the next object in the direction corresponding to gesture 1210. The technology displays the second object as zoomed-to-width and with no offset in displayed portion 830.

In FIG. 13, while display portion 800 showing object 410 zoomed-to-width and with no offset is displayed, the electronic device receives gesture 1310. Embodiments of the technology classify gesture 1310 as a gesture of the second type causing the technology to determine a second object to display. In this case, the page model indicates that a clockwise two-finger gesture corresponds to the next-clockwise object in the page, i.e., object 420. The technology displays object 420 as zoomed-to-width and with no offset as displayed portion 850.

The above examples illustrate that various page models and various gesture classifications can be used in accordance with the present technology. In the enabling embodiments disclosed herein, a gesture of a first type received while a first object is displayed will cause the technology to continue display the first object. A gesture of a second type received while a first object is displayed will cause the technology to determine a second object to display based on the gesture and the page model. The determined second object will then be displayed. In some embodiments, when the second object is displayed, it is displayed zoomed-to-width and with no offset.

The steps in the information processing methods described above can be implemented by running one or more functional modules in information processing apparatus such as general purpose processors or application specific chips. These modules, combinations of these modules, and/or their combination with general hardware (e.g., as described above with respect to FIG. 1 and FIG. 3) are all included within the disclosed technology.

The foregoing description, for purpose of explanation, has been described with reference to specific embodiments. However, the illustrative discussions above are not intended to be exhaustive or to limit the invention to the precise forms disclosed. Modifications and variations are possible in view of the above teachings of the present disclosure. For example, the displayed portion described herein can occupy all of the display of the electronic device, or it can occupy a window in the display of the electronic device. For example, in some embodiments, though another object is positioned adjacent the object being displayed, the adjacent object will not be displayed (absent an appropriate gesture) even if the offset of the displayed object is such that the displayed portion of the page would otherwise include the adjacent object. The embodiments were chosen and described in order to best explain the principles of the invention and its practical applications, to thereby enable others skilled in the art to best utilize the technology.

What is claimed is:

1. A method comprising:
in an electronic device adapted to display pages and to receive gestures, each page comprising objects and characterized by a page model relating objects:
displaying a page comprising a plurality of objects;
receiving an instruction from a user to display a zoomed-in view of a first object of the plurality of objects;
displaying at least a portion of the first object zoomed-in to its full width at a first level of magnification;
receiving a gesture from the user;
classifying the received gesture as a first gesture type or a second gesture type, wherein the first gesture type is different from the second gesture type;
for a gesture of the first gesture type, scrolling vertically at least the portion of the first object;
for a gesture of the second gesture type:
determining a second object of the plurality of objects to display based on the received gesture and the page model; and
ceasing to display at least the portion of the first object at the first level of magnification and displaying at least a portion of the determined second object zoomed-in to its full width at a second level of magnification that is different from the first level of magnification,
wherein displaying at least the portion of the determined second object zoomed-in to its full width includes:
determining if the second object precedes or follows the first object in the page model;
in accordance with a determination that the second object follows the first objet in the page model, displaying the top of the second object;
in accordance with a determination that the second object precedes the first object in the page model, displaying the bottom of the second object.

2. The method of claim 1 wherein:
scrolling vertically at least a portion of the first object further comprises inhibiting the effect of the received gesture on at least one aspect of displaying the first object.

3. The method of claim 2 wherein:
inhibiting the effect of the received gesture on at least one aspect of displaying the first object comprises inhibiting horizontal scrolling.

4. The method of claim 3 wherein:
displaying at least the portion of the first object comprises displaying at least the portion of the first object with no vertical object-to-display offset.

5. The method of claim 1 wherein
displaying at least the portion of the determined second object comprises displaying at least the portion of the determined second object with no vertical object-to-display offset.

6. The method of claim 1, wherein:
the received gesture is characterized by gesture attributes; and
classifying the received gesture is based on a weighted vector of at least one gesture attribute.

7. The method of claim 6, wherein:
the received gesture is a single finger gesture characterized by attributes comprising gesture origin, gesture length, gesture time duration, and gesture direction.

8. The method of claim 1, wherein the plurality of objects are distinct columns of text.

9. The method of claim 1, wherein at least the portion of the determined second object is displayed at the top of the second object.

10. A computer-readable storage memory storing particular instructions which, when executed by one or more processors, cause the one or more processors to perform specified operations, the particular instructions comprising:
instructions to cause a device to display a page comprising a plurality of objects;
instructions to cause a device to receive an instruction from a user to display a zoomed-in view of a first object of the plurality of objects;
instructions to cause a device to display at least a portion of the first object zoomed-in to its full width at a first level of magnification;
instructions to cause a device to receive a gesture from the user;
instructions to cause a device to classify the received gesture as a first gesture type or a second gesture type, wherein the first gesture type is different from the second gesture type;
instructions to cause a device to scroll vertically at least the portion of the first object for a gesture of the first gesture type;
for a gesture of the second gesture type:
instructions to cause a device to determine a seemed object of the plurality of objects-to display based on the received gesture and the page model; and
instructions to cause a device to cease to display at least the portion of the first object at the first level of magnification and display at least a portion of the determined second object zoomed-in to its full width at a second level of magnification that is different from the first level of magnification,
wherein displaying at least the portion of the determined second object zoomed-in to its full width includes:
determining if the second object precedes or follows the first object in the page model;
in accordance with a determination that the second object follows the first objet in the page model, displaying the top of the second object;
in accordance with a determination that the second object precedes the first object in the page model, displaying the bottom of the second object.

11. The computer-readable storage memory of claim 10, wherein the instructions to cause a device to scroll vertically at least a portion of the first object further comprises instructions for inhibiting the effect of the received gesture on at least one aspect of displaying the first object.

12. The computer-readable storage memory of claim 11, wherein the particular instructions further comprise instructions to inhibit the effect of the received gesture on at least one aspect of displaying the first object comprises inhibiting horizontal scrolling.

13. The computer-readable storage memory of claim 12, wherein the particular instructions further comprise instructions to display at least the portion of the first object comprises displaying at least the portion of the first object with no vertical object-to-display offset.

14. The computer-readable storage memory of claim 10, wherein the particular instructions further comprise instructions to display at least the portion of the determined second object comprises displaying at least the portion of the determined second object with no vertical object-to-display offset.

15. The computer-readable storage memory of claim 14, wherein the particular instructions further comprise instructions to:
characterize the received gesture by gesture attributes; and
classify the received gesture based on a weighted vector of at least one gesture attribute.

16. The computer-readable storage memory of claim 10, wherein:
the received gesture is a single finger gesture characterized by attributes comprising gesture origin, gesture length, gesture time duration, and gesture direction.

17. The computer-readable storage memory of claim 10, wherein the plurality of objects are distinct columns of text.

18. The computer-readable storage memory of claim 10, wherein at least the portion of the determined second object is displayed at the top of the second object.

19. A device comprising:
a display adapted for displaying a page, the page comprising objects and characterized by a page model relating objects;
a touch sensitive surface adapted for receiving gesture input;
a data processing system, and
a computer program product comprising:
at least one computer-readable memory storing program code executable by the data processing system;
the program code comprising instructions that when executed by the data processing system are operable for:
displaying a page comprising a plurality of objects;
receiving an instruction from a user to display a zoomed-in view of a first object of the plurality of objects;
displaying at least a portion of the first object zoomed-in to its full width at a first level of magnification on a display of the electronic device;
receiving a gesture on the electronic device;
classifying the received gesture as a first gesture type or a second gesture type: wherein the first gesture type is different from the second gesture type;
for a gesture of the first gesture type, scrolling vertically at least the portion of the first object on the display;
for a gesture of the second gesture type:
determining a second object of the plurality of objects based on the received gesture and the page model; and
ceasing to display at least the portion of the first object at the first level of magnification and displaying at least a portion of the determined second object zoomed-in to its full width on the display at a second level of magnification that is different from the first level of magnification,
wherein displaying at least the portion of the determined second object zoomed-in to its full width includes:
determining if the second object precedes or follows the first object in the page model;
in accordance with a determination that the second object follows the first objet in the page model, displaying the top of the second object;
in accordance with a determination that the second object precedes the first object in the page model, displaying the bottom of the second object.

20. The device of claim 19 wherein:
scrolling vertically at least a portion of the first object further comprises inhibiting the effect of the received gesture on at least one aspect of displaying the first object.

21. The device of claim 20 wherein:
inhibiting the effect of the received gesture on at least one aspect of displaying the first object comprises inhibiting horizontal scrolling.

22. The device of claim 21 wherein:
displaying at least the portion of the first object comprises displaying at least the portion of the first object with no vertical object-to-display offset.

23. The device of claim 20 wherein:
displaying at least the portion of the determined second object comprises displaying at least the portion of the determined second object with no vertical object-to-display offset.

24. The device of claim 20, wherein:
the received gesture is characterized by gesture attributes; and
classifying the received gesture is based on a weighted vector of at least one gesture attribute.

25. The device of claim 24, wherein:
the received gesture is a single finger gesture characterized by attributes comprising gesture origin, gesture length, gesture time duration, and gesture direction.

26. The device of claim 19, wherein the plurality of objects are distinct columns of text.

27. The device of claim 19, wherein at least the portion of the determined second object is displayed at the top of the second object.

* * * * *

UNITED STATES PATENT AND TRADEMARK OFFICE
CERTIFICATE OF CORRECTION

PATENT NO. : 9,552,067 B2  
APPLICATION NO. : 13/863993  
DATED : January 24, 2017  
INVENTOR(S) : Smith Page 1 of 1

It is certified that error appears in the above-identified patent and that said Letters Patent is hereby corrected as shown below:

In the Claims

Claim 1, Column 21, Line 39, delete "first objet in" and insert --first object in--;

Claim 5, Column 21, Line 57, delete "1 wherein" and insert --1 wherein:--;

Claim 10, Column 22, Line 32, delete "a seemed" and insert --a second--;

Claim 10, Column 22, Line 47, delete "first objet in" and insert --first object in--;

Claim 10, Column 22, Line 48, delete "object;" and insert --object; and--.

Signed and Sealed this
Fourth Day of April, 2017

Michelle K. Lee
*Director of the United States Patent and Trademark Office*